United States Patent [19]
Date et al.

[11] Patent Number: 5,496,977
[45] Date of Patent: Mar. 5, 1996

[54] MULTIPLE CIRCUIT SWITCH WITH IMPROVED MULTIPOSITION FOR JOYPAD ACTUATOR

[75] Inventors: Toshinori Date; Yasuo Takasu, both of Tokyo, Japan

[73] Assignee: Sega Enterprises, Ltd., Tokyo, Japan

[21] Appl. No.: 83,670

[22] Filed: Jun. 28, 1993

[30] Foreign Application Priority Data

Jun. 30, 1992 [JP] Japan ................. 4-173020

[51] Int. Cl.⁶ .................. H01H 25/04; H01H 13/70
[52] U.S. Cl. .................. 200/6 A; 200/5 A; 200/339; 200/517; 200/557
[58] Field of Search .................. 200/5 R, 5 A, 200/6 R, 6 A, 17 R, 18, 512–517, 339, 553, 557

[56] References Cited

U.S. PATENT DOCUMENTS

| | | | |
|---|---|---|---|
| 4,246,452 | 1/1981 | Chandler | 200/5 A |
| 4,488,017 | 12/1984 | Lee | 200/5 R |
| 4,493,219 | 1/1985 | Sharp et al. | 338/47 X |
| 4,493,959 | 1/1985 | Viebrantz | 200/517 |
| 4,687,200 | 8/1987 | Shirai | 200/5 A X |
| 4,896,003 | 1/1990 | Hsieh | 200/6 A |
| 4,918,264 | 4/1990 | Yamamoto et al. | 200/5 R |
| 4,992,631 | 2/1991 | Gee | 200/5 A |
| 5,012,230 | 4/1991 | Yasuda | 340/706 |
| 5,089,677 | 2/1992 | Satou | 200/339 |

FOREIGN PATENT DOCUMENTS

| | | | |
|---|---|---|---|
| 0088365 | 9/1983 | European Pat. Off. | H01H 3/12 |
| 0477098 | 3/1992 | European Pat. Off. | G06K 11/18 |
| 2531215 | 2/1985 | France | G01L 1/02 |
| 2613850 | 10/1988 | France . | |
| 3843650 | 7/1989 | Germany | H01H 15/00 |
| 63-137427 | 9/1988 | Japan | H01H 25/04 |
| 1-103135 | 7/1989 | Japan | H01H 15/16 |
| 3-50594 | 10/1991 | Japan . | |
| 4-42029 | 4/1992 | Japan | H01H 25/00 |
| 2204387 | 11/1988 | United Kingdom . | |
| WO90/15427 | 12/1990 | WIPO | H01H 25/04 |

*Primary Examiner*—J. R. Scott
*Attorney, Agent, or Firm*—Michael N. Meller

[57] ABSTRACT

A control key device having a contact member which comprises at least a first and second contact portion such that when an operating force is applied to the first contact portion the second contact portion is caused to touch the first contact portion so that predetermined electrical contact is established. The causing of the second contact portion touching the first contact portion results from an operating force elastically transforming the shape of the contact member. A tilting mechanism is provided by a guiding member of predetermined shape having a through hole. The tilting mechanism functions to tilt the contact member in response to an operating force applied to the contact member. The contact member has a key portion and a pad portion defining a home position and a tilted position.

10 Claims, 9 Drawing Sheets

5,496,977

MULTIPLE CIRCUIT SWITCH WITH IMPROVED MULTIPOSITION FOR JOYPAD ACTUATOR

BACKGROUND OF THE INVENTION

The present invention relates to a control-key device. In such a control-key device, an appropriate operating force is applied by an operator to a contact member thereof. Then, the contact member is thus transformed. The transformation of the contact member results in some contacts coming in contact with each other. Some kind of control-key devices further have the following functions. One of such kind of control-key devices has a plurality of pairs of contacts. Electrical contact is established in a desired pair of contacts from among the plurality of pairs of contacts as a result of an appropriate operating force being applied by an operator. Further, the establishment of electrical contact in a desired pair of contacts from among the plurality of pairs may indicate a desired direction of a plurality of directions. The desired direction corresponds to the pair of contacts in which the electrical contact is established. The plurality of directions may be assigned by the plurality of pairs of contacts. Thus, the operator may specify or select a desired direction from among a plurality of directions using the above kind of control-key device by appropriately operating them. This appropriate operation of the control-key device is executed by movement of a finger of the operator, which finger touches the key of the control-key device.

In the known art, such kind of control-key device is used in computers, for example, video game apparatus including video game apparatus of business use or video game apparatus of personal use. In these video game apparatus, a display screen such as using a liquid crystal display device is provided. In this display screen, a character is moved in response to an operation performed on the video game apparatus by an operator. The character is an object representing in the display screen. The operator may specify the movement of the character using the control-key device mentioned above. Using the control-key device, the operator may specify or may select a direction in which the character moves. The direction selected is selected from various directions, for example, 4 directions, the top, bottom, right and left, or 8 directions, the top, bottom, right, left, top left, top right, bottom left, and bottom right.

The Japanese Utility-Model Publication No. 3-50594 (Japanese Utility-Model Application No. 61-58549) discloses such a conventional control-key device. The disclosed control-key device is such as shown in FIG. 1. In FIG. 1, a sectional view is shown.

In FIG. 1, the control-key device is operated as follows. The operator may push the control-key device on a pad 110. Pushing of the center of the pad 110 downward in FIG. 1 causes the supporting-point member 113 to move downward. A supporting member 122 is elastically transformed as a result of the pad 110 being pushed downward as mentioned above. This elastic transformation of the supporting member 122 results in the downward motion of the supporting-point member 113. This downward motion of the supporting-point member 113 results in it touching a substrate 140. Thus, the supporting member 113 will then act as a supporting point with respect to a motion of the pad 110.

This control-key device has a construction such that the following state is established. Even the pad 110 has been moved downward as mentioned above, none of the conductive rubber plates 130a and 130b comes in contact with any of electrical contact portions 141 and 142. The conductive rubber plates 130a and 130b are fixed on a supporting member 133. The electrical contact portions are provided on the substrate 140.

Then, the operator may push the projection 111a as well as pushing the center of the pad 110 as mentioned above. Then, the operator pushes the projection 111a as mentioned above, a disk 112 as well as the pad 110 accordingly tilts with respect to the substrate 140. This tilting is executed with respect to the supporting point formed by the supporting-point member 113. As a result, the tilting of the disk 112 results in the conductive rubber plate 130a touching the electrical contact portion 141. This results in a pair of contacts constituting the electrical contact portion 141 electrically coming in contact with each other. That is, electrical contact is established in the electrical contact portion 141. This electrical contact results in a predetermined electrical circuit, not shown, being closed.

A drawback involved in such a conventional control-key device as shown in FIG. 1 will now be described. In the control-key device, the supporting-point member 113 is rigidly fixed on the pad 110. The supporting-point member 113 is used for forming the supporting point as mentioned above. Some force may be applied to the pad 110. Then, this force is transmitted to the substrate 140 via the supporting-point member 113. Thus, so a strong force may be applied to the pad as to damage wirings themselves or wiring connections formed on the substrate 140.

SUMMARY OF THE INVENTION

An object of the present invention is to provide a control-key device. In the control-key device, a shock applied on a key pad cannot be directly transmitted to a substrate which acts as a part of the control-key device. Thus, such a shock may not result in damage occurring in wirings themselves or wiring connections formed on the substrate.

To achieve the object of the present invention, the control-key device according to the present invention comprises: at least one second contact portion wherein an operating force applied thereto may cause said second contact portion to touch said first contact portion so that predetermined electrical contact is established, the causing of said second contact portion touching said first contact portion being a result of an operating force elastically transforming the shape of said contact member;

wherein said control-key device further comprising tilting means for tilting said contact member with respect to said contact plate in response to an operating force being applied to said contact member, said tilting occurring as a result of said tilting means defining a manner of said elastic transformation of said contact member.

In the above-mentioned construction, the control-key device operates as follows. The operator may push the control-key device on the contact member with his or her finger. The operator intends to establish the predetermined electrical contact by this pushing. This pushing causes the contact member to tilt with respect to the contact plate as the effect of the tilting means. Simultaneously with the tilting, the shape of the contact member is elastically transformed. Thus, the transformation of the contact member results in the predetermined electrical contact being established as a result of the first contact portion touching the second contact portion. Then, after the operator releases the pushing force applied to the contact member, the tilting and transformation of the contact member are thus canceled. This removal occurs as a result of the elastic recovery force being applied by and being applied to the contact member. Thus, the contact member is returned to a neutral position in which none of the operation force is applied to the contact member. Thus, the established electrical contact is canceled.

Further, the control-key device according to the present invention may further comprises a force-applying means for applying a returning force to said contact member, wherein said returning force is effected so that said contact member is returned to a neutral position when said contact member goes out from said neutral position as a result of tilting with effect of said tilting means, in which neutral position said contact member is located when no operating force is applied to said contact member.

This provision of the above-mentioned force-applying means may create an improved "click feeling". The operator feels the click feeling when he or she pushes the contact member and/or releases the pushing force applied on the contact member. The operator feels this click feeling through his or her finger in response to the finger pushing the contact member of the finger releasing the pushing force. Such a click feeling is useful. That is, the operator's operation performed on the control-key device may be acknowledged by the click feeling being felt in response to the operation.

The control-key device according to the present invention may further comprise a force adjusting means for adjusting an amount of said returning force.

By the force adjustment means, the pushing force constituting the above mentioned click feeling may be adjusted. Thus, a desired level of the pushing force is realized in the click feeling and thus the desired click feeling may be created.

Other objects and further features of the present invention will become more apparent from the following detailed description when read in conjunction with the accompanying drawings.

DESCRIPTION OF PREFERABLE EMBODIMENTS

A first embodiment of the control-key device according to the present invention will now be described with reference to FIGS. 2 and 3.

Figure 2:
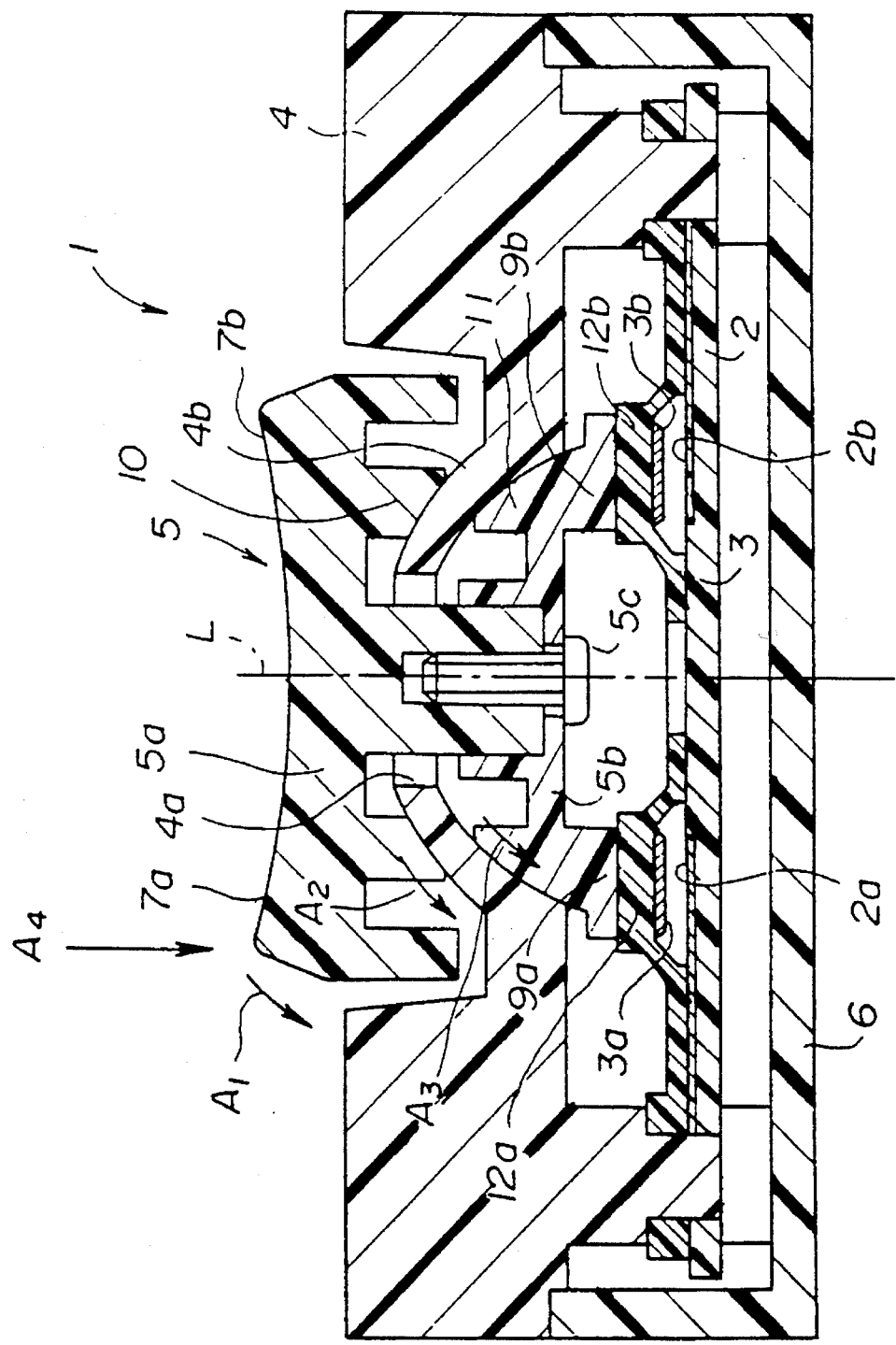
FIG. 2 shows a sectional view of a first embodiment of a control-key device according to the present invention.
Figure 3:
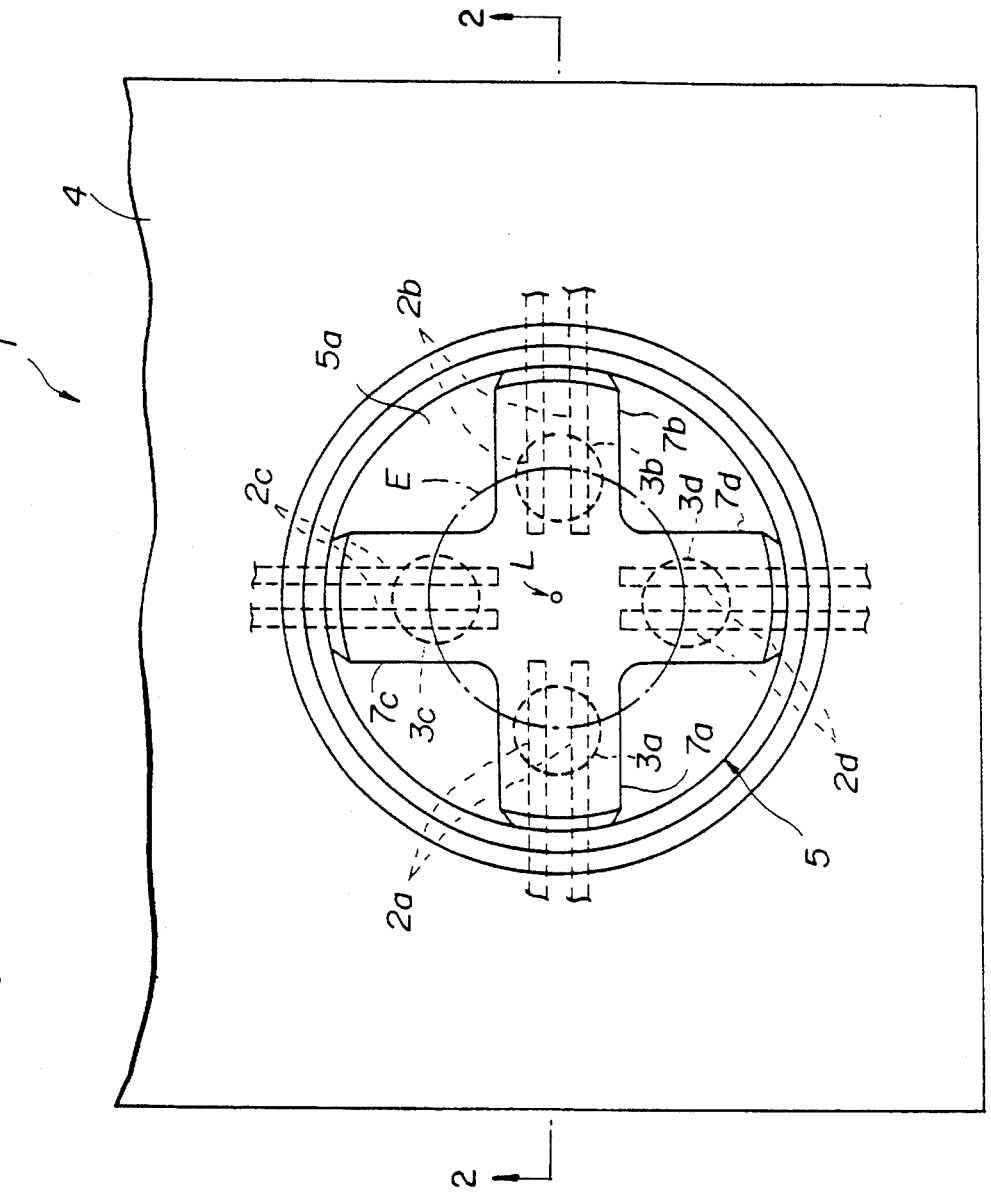
FIG. 3 shows a plan view of the first embodiment shown on FIG. 2.

The control-key device 1 shown in FIGS. 2 and 3 comprises a circuit substrate 2, an elastic member 3, a front housing 4, a pad 5 and a rear housing 6. Total 4 pairs of electrical contacts 2a, 2b a 2c and 2d are provided on the circuit substrate 2. As shown in FIG. 3, four pieces of conductive portions 3a, 3b, 3c and 3d are provided on the elastic member 3. Each of the conductive portions 3a, 3b, 3c and 3d is aligned with a respective one pair of the pairs of electrical contacts 2a to 2d. Thus, each of the conductive portions 3a, 3b, 3c and 3d is located just above (in FIG. 2) of a respective one pair of the pairs of electrical contacts 2a to 2d.

The shape of the conductive elastic member 3 is transformed as result of a pushing force being applied thereto from the top thereof in FIG. 2. This transformation may cause a conductive portion from among the conductive portions 3a to 3d to come in contact with a pair of electrical contacts from among the pairs of electrical contacts 2a to 2d. The come-in-contact pair of electrical contacts corresponds to, in its location, the coming-in-contact conductive portion. The coming-in-contact conductive portion is determined from among the conductive portions 3a to 3d according to the manner in which the elastic member transforms.

The above-mentioned coming-in-contact between the conductive portion and the pair of electrical contacts results in the pair of electrical contacts completing the circuit.

The front housing 4 is used for covering the front surface of the circuit substrate 2. The pairs electrical contacts 2a to 2d are provided on the front surface of the substrate 2. The reap housing 6 is used for covering the rear surface of the substrate 2.

The pad 5 comprises a key member 5a and a contact pushing member 5b. The key member 5a is fixed to the contact pushing member 5b through the screw 5c. The key member 5a constitutes a key operating part. The key operating part is exposed outside of the front housing 4 so that the operator may push the key operating part. The contact pushing member 5b is located so that the contact pushing member may be used for pushing the elastic member 3.

The contact pushing member 5b will now be described in detail. The contact pushing member 5b has four foot portions 9a, 9b, 9c and 9d. The elastic member has four force bearing portions 12a, 12b, 12c and 12d. The force bearing portions 12a to 12d are respectively aligned with the foot portions 9a to 9d of the contact pushing member 5b. The conductive portions 3a to 3d are respectively fixed on the force bearing portions 12a to 12d. Each of the foot portions 9a to 9d comes in contact with and pushes from the top in FIG. 2 a respective one of the conductive portions 3a to 3d via a respective one of the force bearing portions 12a to 12d.

Projections 7a, 7b, 7c and 7d are provided with the key member 5a at the top thereof. The projections 7a to 7d are exposed outside of the front housing 4. The projections 7a to 7d respectively extend radially in four directions, the top, bottom, right and left in FIG. 3. Each of the projection 7a to 7d is aligned with a respective pair of contacts of the pairs of contacts 2a to 2d.

The front housing 4 has a through hole 4a which has a center axis identical to a center line L of a circle E shown in FIG. 3. The pairs of electric contacts 2a to 2d are arranged so that they are located on the outline of the circle E as shown in FIG. 3. The front housing has a dome portion 4b extending radially at the circumference of the through hole 4a. The dome portion 4b forms a substantially half-sphere shape. The concavity surface of the half-sphere shape faces to the substrate 2.

The key member 5a is fixed to the contact pushing member 5b via the through hole 4a of the front housing 4. The key member 5a is firmly fixed to the member 5b with a screw 5c. The key member 5a has a sliding portion 10 while the contact pushing member 5b has a sliding portion 11. The sliding portions 10 and 11 are respectively in contact with the outside and inside surfaces of the dome portion 4b as shown in FIG. 2.

Operation of the above-mentioned control-key device 1 will now be described.

The operator may intend to establish electrical contact of or a closed circuit between the pair 2a of electrical contacts. In this housing, the operator should put his or her finger on the top of the key member 5a, and then should push the projection 7a downward according to the arrow $A_4$ shown in FIG. 2. This pushing force causes the following operation in the control-key device 1. The sliding portion 10 of the key member 5a slides on the outside surface of the dome portion 4b according to the arrow $A_2$ shown in FIG. 2, while the sliding portion 11 of the contact pushing portion 5b slides on the inside surface of the dome portion 4b according to the arrow $A_3$ shown in FIG. 2.

Thus, the pad 5 tilts or rotates counter-clock-wise according to the arrow $A_1$ shown in FIG. 2. As a result, the left side foot portion 9a of the contact pushing member 5b pushes the conductive portion 3a of the elastic portion 3 downward in FIG. 2 accordingly. Thus, the pushed elastic portion 3 is elastically transformed so that the conductive portion 3a closed-circuits the pair 2a of electrical contacts.

Then, when the pushing force applied to the projection 7a by the operator's finger is released, the control-key device operates as follows. The elastic recovery force of the elastic member 3 effects so as to make the force bearing portion 12a push the foot portion 9a upward in FIG. 2. As a result, the sliding portion 10 of the key member 5a slides on the outside surface of the dome portion 4b according to the reverse direction of the arrow $A_2$ shown in FIG. 2, while the sliding portion 11 of the contact pushing portion 5b slides on the inside surface of the dome portion 4b according to the reverse direction of the arrow $A_3$ shown in FIG. 2.

Thus, the pad 5 rotates clock-wise according to the reverse direction of the arrow $A_1$ shown in FIG. 2 so that the tilting of the pad 5 is canceled. Thus, the pad 5 returns to its neural position in which position no operating force by the operator is applied to the pad 5. As a result, the downward pushing force by the left side foot portion 9a of the contact pushing member 5b applied to the conductive portion 3a of the elastic portion 3 in FIG. 2 is canceled. Thus, the elastic transformation of the elastic portion 3 is canceled so that the closed-circuiting by the conductive portion 3a between the pair 2a of electrical contacts is canceled.

Figure 1:
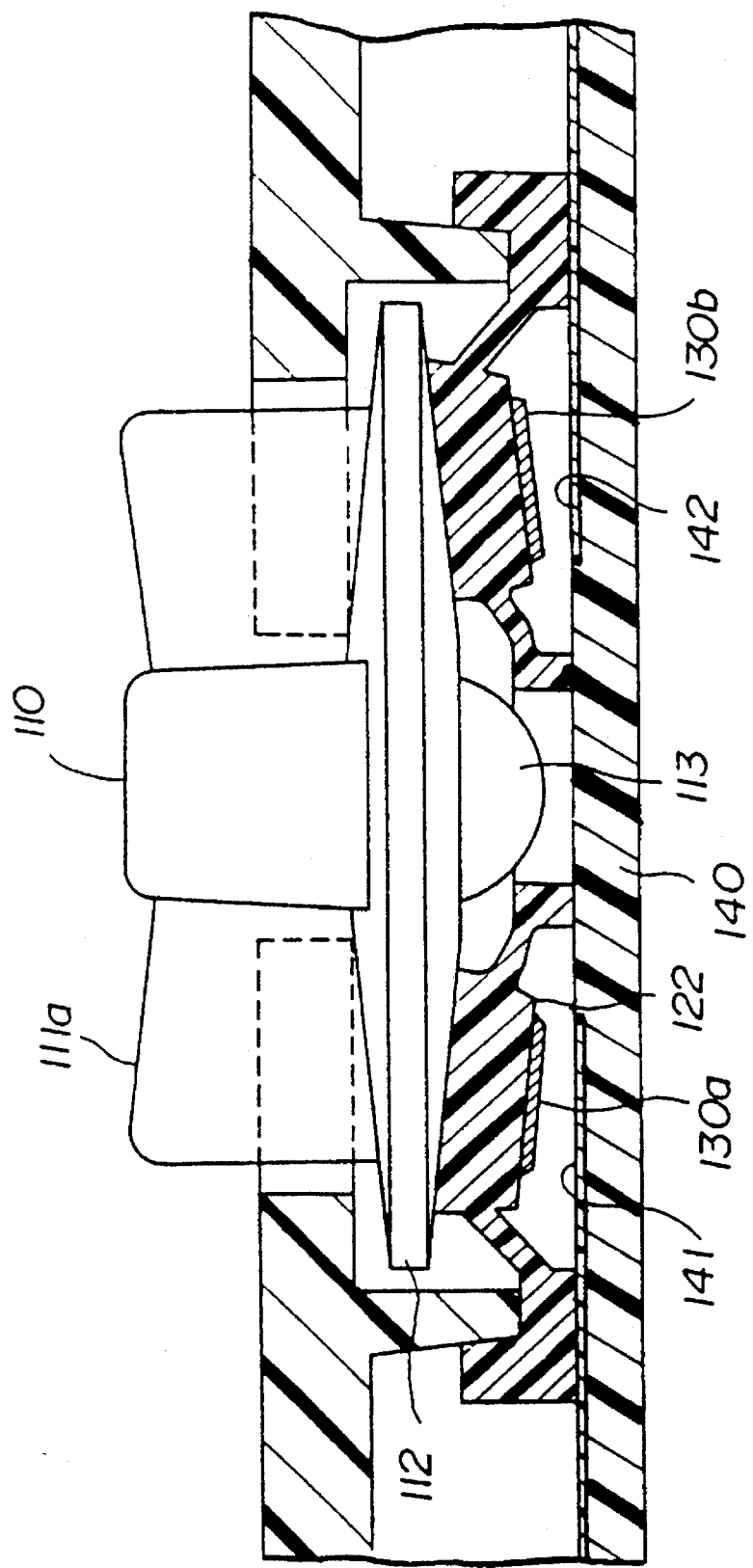
FIG. 1 shows a sectional view of a conventional control-key device.

By the construction of the control-key device 1, the following advantages can be given. The supporting-point member 113 of the device as shown in FIG. 1 becomes unnecessary. This is because in the device 1 shown in FIG. 2 the pad 5 may rotate according to sliding motion of the pad 5 on the surfaces of the dome portion 4b through the sliding portions 10 and 11 as mentioned above. In this construction shown in FIG. 2, the dome portion 4b guides the tilting or rotating motion of the pad 5. This eliminates the supporting-point portion 113 which forms the supporting point by engaging the substrate as mentioned above. The construction shown in FIG. 2 as well as the construction shown in FIG. 1 can ensure the establishment of a desired pair of electrical contacts being closed-circuited or come in contact with each other, as a result of an appropriate operation to be performed by the operator.

This eliminating of the supporting-point member 113 may create the following advantage. Even if a strong shock is applied to the top of the pad 5 downward, the strong shock is prevented from being directly transmitted to the substrate 2. Thus, damage occurring in wiring themselves or wiring connections may be prevented.

Figure 4:
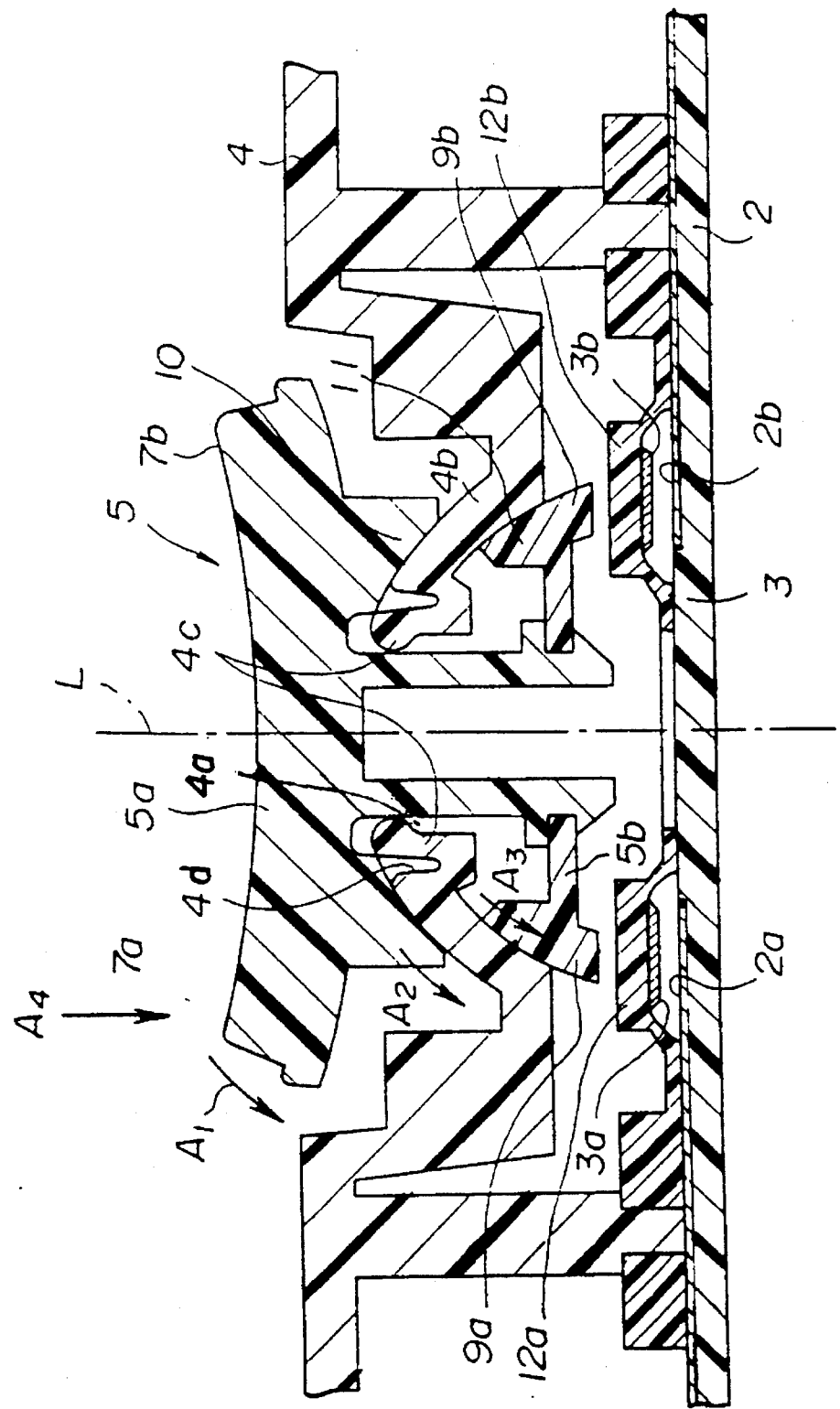
FIG. 4 shows a sectional view of a second embodiment of the control-key device according to the present invention.
Figure 5:
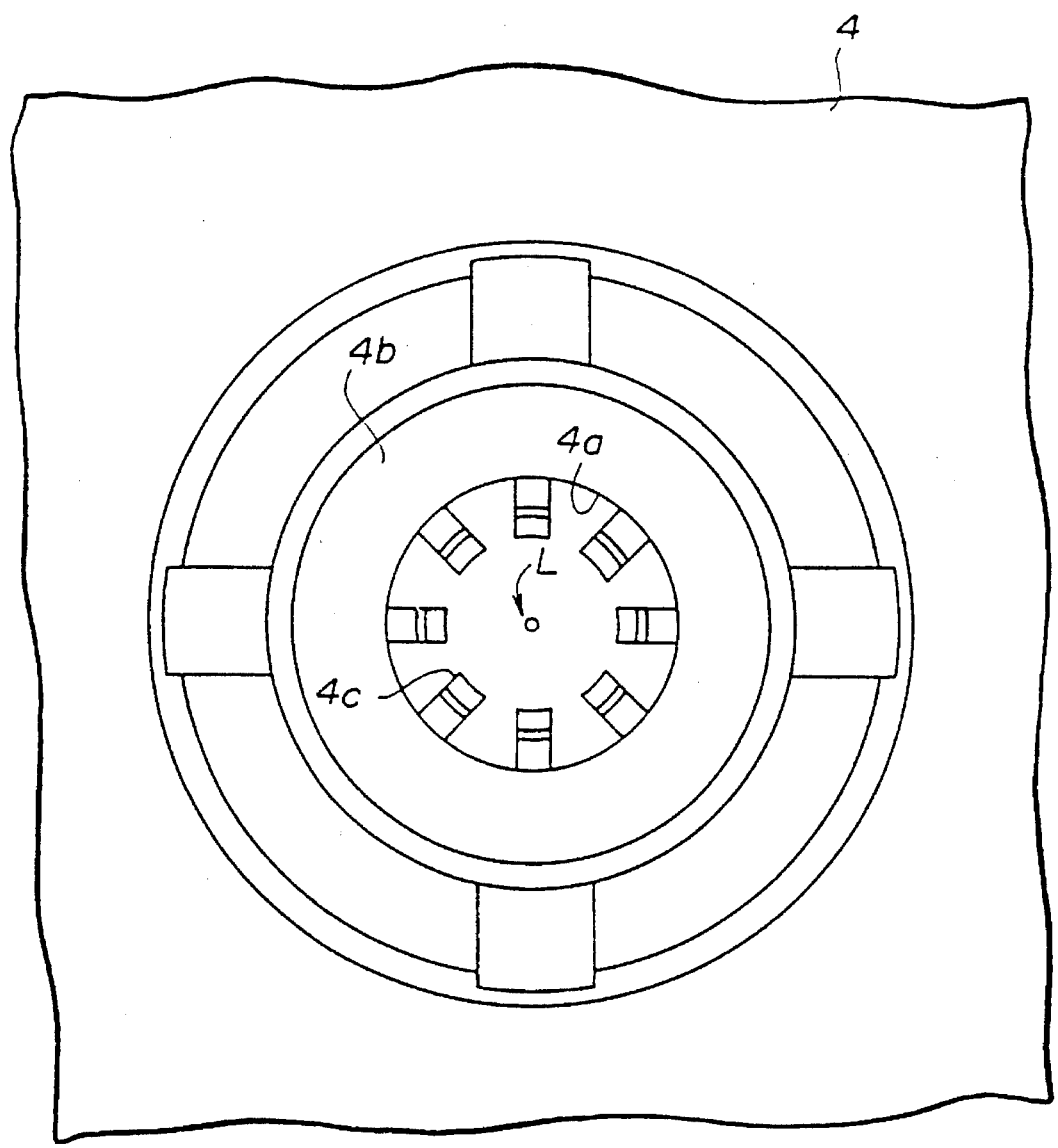
FIG. 5 shows a plan view of a front housing of the second embodiment shown in FIG. 4.

A second embodiment of the control-key device according to the present invention will now be described with reference to FIGS. 4 and 5. In FIGS. 4 and 5, the same reference numbers as those in FIG. 2 are assigned to portions having the same names as those in FIG. 2. Then, features of the second embodiment of the control-key device will be described later, which features are different from those in the device shown in FIG. 2. Other embodiments will be described in a manner same as the above in which the second embodiment will be described.

In FIGS. 4 and 5, the key member 5a of the pad 5 is fixed to the contact pushing member 5b of the pad 5. This fixing is executed by a projection formed on the contact pushing member 5b being fitted in a corresponding concavity formed on the key member 5a. A plurality of spring portions 4c are formed so as to respectively project toward the center line L, as shown in FIG. 5. The ditches 4d formed in the dome portion 4b of the front housing 4 to give the spring portion 4c space to move. The front housing 4 is made of resin material. Thus, each of the spring portion 4c acts as a spring which applies a force to the key member 5a so as to push the key member 5a toward the center of the through hole 4a.

In this second embodiment, in addition to the advantages given in the first embodiment shown in FIGS. 2 and 3, the following advantages are given by the above-mentioned effect of the spring portion 4c. While the pad 5 tilts or rotates, for example, rotates according to the arrow $A_1$, the spring portion 4c tends to make the pad 5 return to the its neutral position shown in FIG. 4. This tilting or rotation occurs as a result of the operator pushes the key member 5a with his or her finger. This function of the spring portions 4c results in a resistance force being created, which resistance force acts against an operating force applied to the key member 5a by the operator's finger. This resistance force may be appropriately adjusted by adjusting the spring constant of the spring portions 4c. This adjustment may improve a "click feeling" such as mentioned above felt by the operator when the operator pushes the key member 5a. In this second embodiment, the pad 5 is returned to the its neutral position by the function of the spring portions 4c while the pad 5 is returned to the its neutral position by the effect of the function of the elastic member 3 in the first embodiment.

A third embodiment of the control-key device according to the present invention will now be described with reference to FIGS. 6 to 8.

Figure 6:
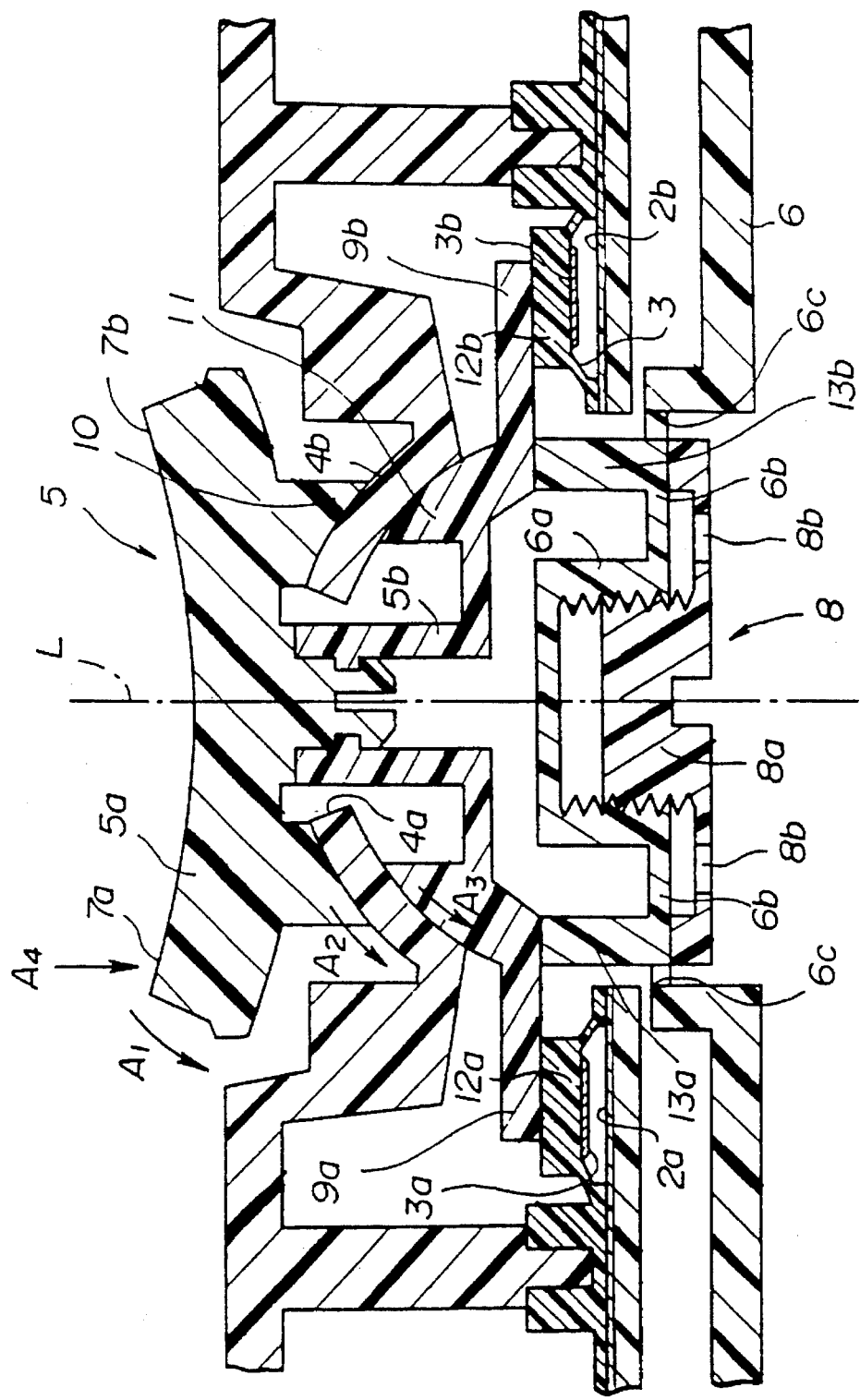
FIG. 6 shows a sectional view of a third embodiment of the control-key device according to the present invention.
Figure 7:
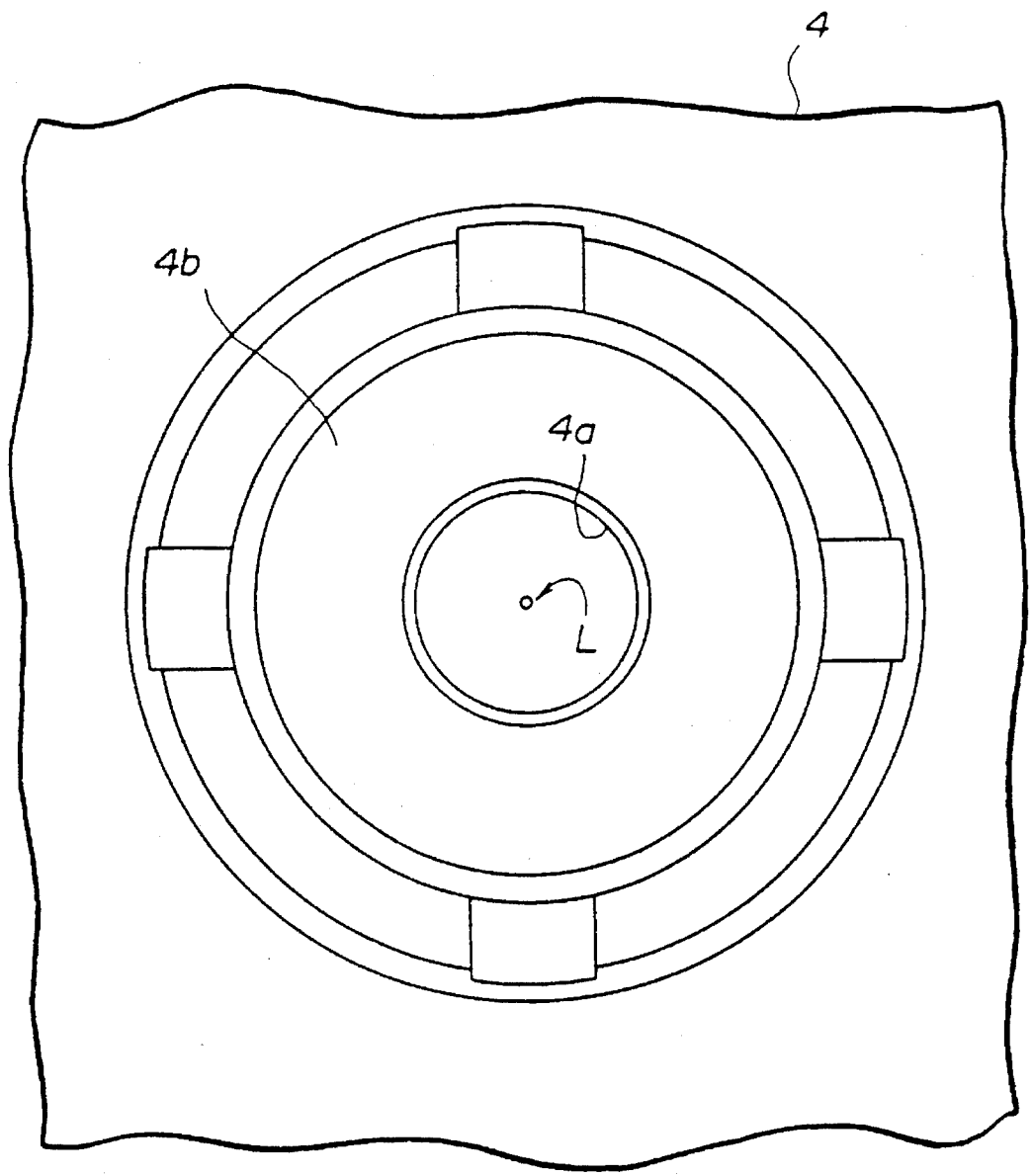
FIG. 7 shows plan view of a front housing of the third embodiment shown in FIG. 6.
Figure 8:
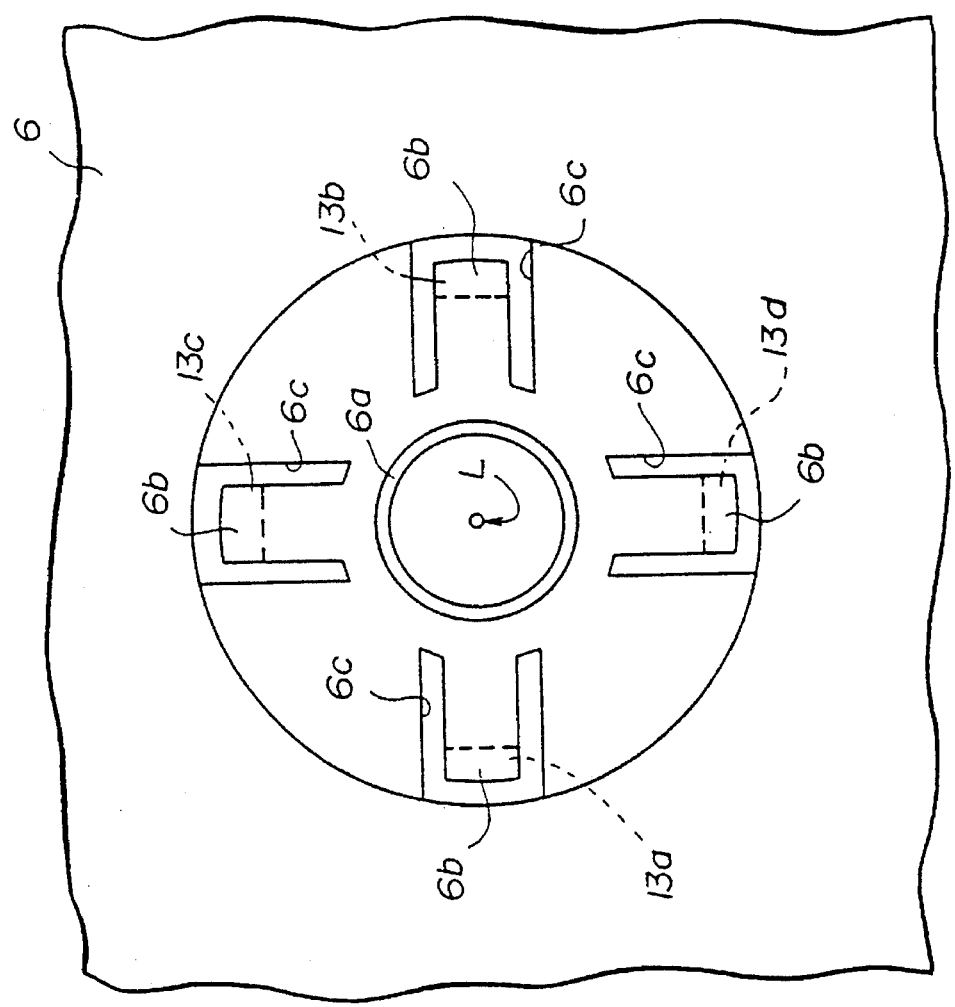
FIG. 8 shows a bottom view of a rear housing of the third embodiment shown in FIG. 6.

In FIGS. 6 to 8, a female-screw portion 6a and four spring portions 6b are formed in the rear housing 6. The center of the female-screw portion 6a coincides with the center line L. As shown in FIG. 8, each of the spring portions 6b are arranged so as to align with the four projections 7a to 7d formed on the key member 5a shown in FIG. 3. The four spring portions 6b are respectively formed by removing corresponding four cutting-out portions 6c from the rear housing 6. Each of the four cutting-out portions 6c has a generally U-letter shape, as shown in FIG. 8. Thus, each of the spring portions 6b extends outward in a direction away from the center line L. The four spring portions 6b respectively have force bearing portions 13a, 13b, 13c and 13d. Each of the force bearing portions 13a to 13d extends upward in FIG. 6.

The rear housing is made of resin material. Thus, the four spring portions 6b act as springs for applying forces to the pad 5 so as to return the pad 5 to the its neutral position while the pad 5 is tilted or rotated, for example, rotated according to the arrow $A_1$. This function of the four spring portions 6b is effected with the force bearing portions 13a to 13d respectively bearing forces applied thereto downward in FIG. 6 via the contact pushing portion 5b. The forces are applied as a result of the operator pushing the key member 5a so as to tilt it.

A force adjustment member 8 is provided in the control-key device shown in FIG. 6. A male screw portion 8a of this force adjustment member 8 is screwed in the female screw portion 6a. Four spring portions 8b are formed on the force adjustment member 8. Each of the four spring portions 8b may be in contact with the bottom, in FIG. 6, of a respective one of the four spring portions 6b.

Rotating of the force adjustment portion 8 with respect to the center line L causes the force adjustment portion 8 to move upward or downward in FIG. 6. This upward/downward movement of the force adjustment portion 8 occurs with the screw function effected between the female screw portion 6a of the rear housing 6 and the male screw portion 8a of the force adjustment portion 8. This upward/downward movement of the force adjustment portion 8 may adjust the force being applied to the four spring portions 6b by the four spring portions 8b. This adjustment is executed as follows. The upward movement of the force adjustment portion 8 increases the force being applied to the four spring portions 6b by the four spring portions 8b. On the other hand, the downward movement of the force adjustment portion 8 decreases the force being applied to the four spring portions 6b by the four spring portions 8b. The adjustment of the force being applied to the four spring portions 6b by the four spring portions 8b results in the adjustment of the above-mentioned force. The above-mentioned force effects to bear the downward force applied to the force bearing portions 13a to 13d by the contact pushing member 5b.

In addition to the advantages given in the first embodiment shown in FIGS. 2 and 3, the following advantages are given by the third embodiment shown in FIGS. 6 to 8. While the pad 5 tilts or rotates, for example, rotates according to the arrow $A_1$, the four spring portions 6b tend to make the pad 5 return to the its neutral position shown in FIG. 6. This tilting or rotation occurs as a result of the operator pushing the key member 5a with his or her finger. This function of the four spring portions 6b results in a resistance force being created, which resistance force acts against an operating force applied to the key member 5a by the operator's finger. This resistance force may be appropriately adjusted by adjusting the spring constant of the spring portions 6b. This adjustment may improve a "click feeling" such as mentioned above felt by the operator when the operator pushes the key member 5a.

Further, the adjustment of the above resistance force may also be performed by means of the force adjustment portion 8 by rotation thereof as mentioned above. This adjustment may be performed after the control-key device has been already manufactured. On the other hand, the adjustment by means of varying the spring constants of the spring portions 6b may be performed only while the control-key device is being manufactured. Thus, the adjustment by means of the adjustment portion 8 offers a "click feeling" optimum to a particular operator easily.

A fourth embodiment of the control-key device according to the present invention will now be described with reference to FIG. 9.

Figure 9:
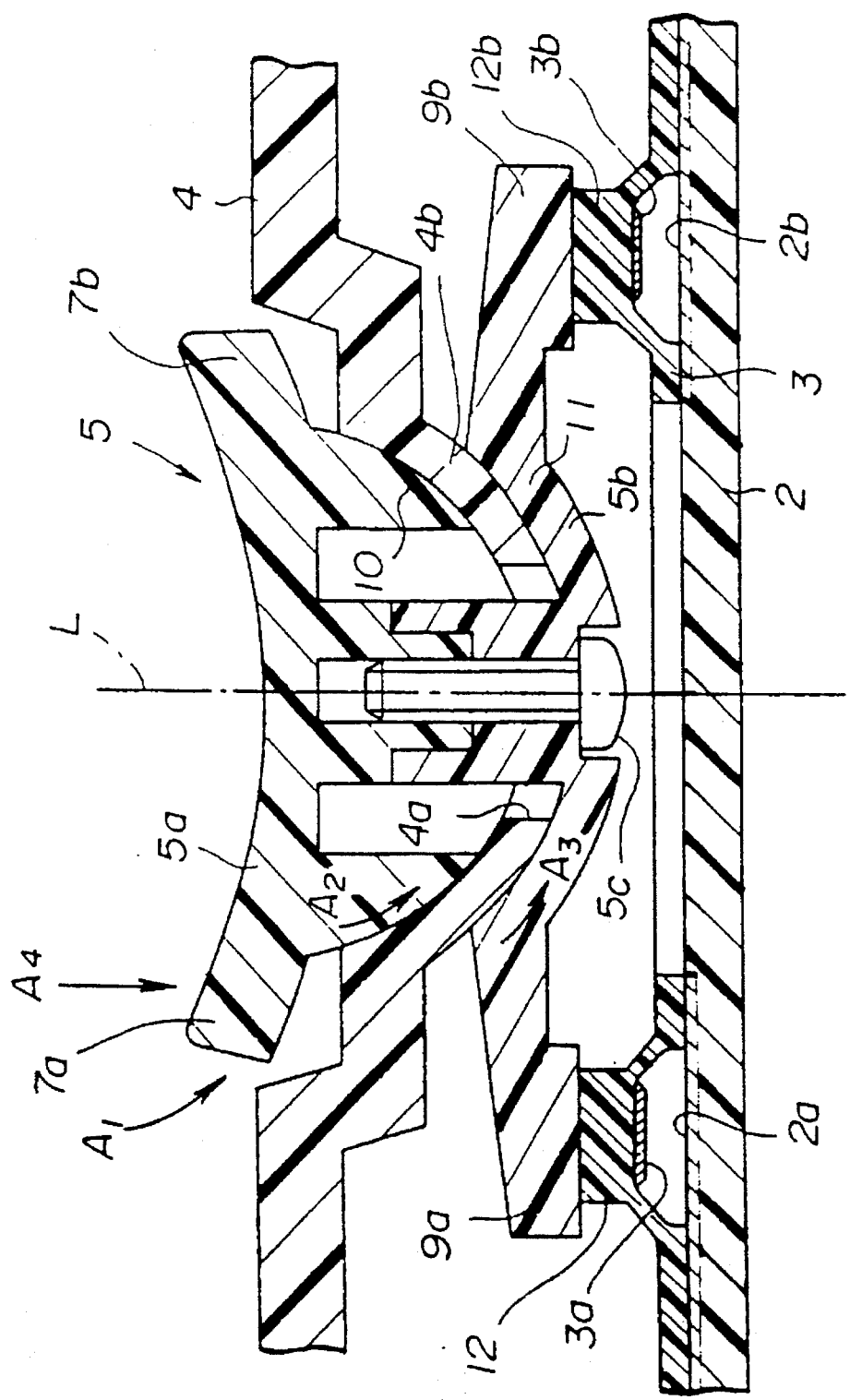
FIG. 9 shows a sectional view of a fourth embodiment of the control-key device according to the present invention.

In FIG. 9, the dome portion 4b formed in the front housing 4 has a half-sphere shape and the convex surface of the half-sphere shape faces toward the substrate 2. The sliding portion 10 formed on the key member 5a is in contact with the inside (the top in FIG. 9) surface of the dome portion 4b while the sliding portion 11 of the contact pushing portion 5b is in contact with the outside (the bottom in FIG. 9) surface of the dome portion 4b.

This fourth embodiment has been obtained as a result of modifying the first embodiment shown in FIGS. 2 and 3. This modification is such that the half-sphere shape of the dome portion 4b is reversed between the top and bottom. That is, the top of the half-sphere shape in the first embodiment becomes the bottom of the half-sphere shape in the fourth embodiment. However, the fourth embodiment shown in FIG. 9 offers the same advantages as those offered by the first embodiment shown in FIGS. 2 and 3.

Further, in the above first to fourth embodiments of the control-key devices according to the present invention, methods for fixing the key member 5a to the contact pushing member 5b comprise the method by means of the screw and the method by fitting the projection to the corresponding concavity. However, the method for fixing the key member 5a to the contact pushing member 5b is not limited to the above-mentioned methods. Any other known method may be employed for this purpose.

Summarizing the above, the control-key devices according to the present invention offer the following advantages. Electrical contact may be established in the desired electrical contact portion. This electrical contact establishment may be realized without requiring the pad 5 to come directly in contact with the substrate 4. Thus, even if a strong shock is applied to the top of the pad 5 downward, the strong shock is prevented from being directly transmitted to the substrate 2. Thus, damage occurring in the wiring itself or wiring connections may be prevented.

The resistance force may be appropriately adjusted, which force makes the pad 5 return to the its neutral position by the spring effect. This adjustment may improve a "click feeling", such as mentioned above, felt by the operator when the operator pushes the key member 5a.

Further, the other adjustment may be performed by adjusting the above-mentioned spring effect even after the control-key device has been already manufactured. Thus, this adjustment offers a "click feeling" optimum to a particular operator easily by varying the spring effect appropriately so as to fulfill the operator's request.

Further, the present invention is not limited to the above described embodiments, and variations and modifications may be made without departing from the scope of the present invention.

What is claimed is:

1. A multi-directional switch assembly comprising: a contact plate, and at least a first contact portion provided on said contact plate and a contact member having at least one second contact portion wherein an operating force applied thereto causes said second contact portion to touch said first contact portion so that predetermined electrical contact is established, the causing of said second contact portion touching said first contact portion resulting from an operating force elastically transforming the shape of said contact member;

tilting means for tilting said contact member with respect to said contact plate in response to an operating force being applied to said contact member, said tilting occurring as a result of said tilting means defining a manner of said elastic transformation of said contact member, said tilting means comprising:

a guiding member substantially fixed to said contact plate said guiding member having a half-sphere shape wherein a concavity surface thereof faces said contact plate and a through hole in substantially the center of said half-sphere shape, wherein said contact member further comprises:

a sliding member substantially fixed to said contact member; wherein said sliding member may slide on said guiding member so that said contact member is tilted with respect to said contact plate in response to an operating force applied to said contact member;

a key portion and a pad portion with said key portion and said pad portion being fixed to each other via said through hole and with said key portion located at a first side of said half-sphere shape of said guiding member while said pad portion is located at a second side of said half-sphere shape of said guiding member, which second side of said half-sphere shape of said guiding member faces said contact plate;

whereby corresponding electrical contact is established as a result of each of said plurality of first contact portions being touched by a corresponding respective one of said plurality of second contact portions by said contact member tilting in a respective direction with respect to said center line of said control-key device, said tilting in respective directions being caused by appropriate respective operating forces as an effect of said tilting means.

2. The multi-directional switch assembly according to claim 1, wherein:

said contact plate has a plurality of said first contact portions and said contact member accordingly has a plurality of said second contact portions, each of said plurality of first contact portions and a respective one of said plurality of second contact portions being touched together so as to establish respective corresponding electrical contact; and said plurality of first contact portions and said plurality of second contact portions are arranged so that each of said plurality of first contact portions and a respective one of said plurality of second contact portions be located in a respective direction with respect to a center line of said control-key device, and said respective directions be different from each other, said center line of said control-key device being aligned with said center of said half-sphere shape of said guiding member; and respective corresponding electrical contact is established as a result of each of said plurality of first contact portions being touched by a corresponding respective one of said plurality of second contact portions as a result of said contact member tilting in a respective direction with respect to said center line of said control-key device, said tilting in respective directions being caused by appropriate respective operating forces with effect of said tilting means.

3. A multi-directional switch assembly comprising:

a casing having a generally dome-shaped portion, said dome-shaped portion having a top surface with spherical curvature and a through hole provided at a central part of said dome-shaped portion;

a substrate provided within said casing and having a plurality of electrical contact portions, each of said electrical contact portions having a pair of electrical contacts;

a resilient member provided on said substrate and having a plurality of protuberant portions at positions corresponding to said electrical contact portions, each of said protuberant portions having an electrically conductive portion which makes electrical contact with the corresponding one pair of the electrical contacts when the protuberant portion is resiliently deformed;

a contact pressing member provided on said resilient member and having a plurality of force-conducting portions at positions corresponding to said protuberant portions; and a key member secured on said contact pressing member via said through hole, said key member having a home position and a tilted position, said contact pressing member being approximately level and said force-conducting portions resting on the corresponding protuberant portions in the home position of said key member when said key member is free of a pressing force, one of said force-conducting portions resiliently deforming the corresponding one of said protuberant portions to achieve an electrical contact between the corresponding pair of electrical contacts in the tilting position when said key member receives a pressing force, said key member including a sliding surface facing, and having a spherical curvature corresponding to said top surface, the tilting of said key member being guided by the movable contact of said sliding surface with said top surface.

4. A multi-directional switch assembly comprising:

a substrate having a pair of electrical contact portions formed on a surface of said substrate, each of said electrical contact portions having a pair of separate electrical contacts;

a pair of movable contact means formed on said surface of said substrate in correspondence with said pair of electrical contact portions, each of said movable contact means having a conductive layer and a resilient means supporting said conductive layer, said movable contact means being placed so that said conducting layers are closely spaced from the corresponding separate electrical contacts;

a guiding member mechanically fixed to said substrate, said guiding member having an outer surface, an inner space and a through hole, said through hole being in alignment with a center portion located between said pair of electrical contact portions at said surface of the substrate, said outer surface having at least a pair of first sliding surface portions-located so that said through hole is located therebetween and constituting part of a spherical surface; and a control means having key-top portion and a pair of force-conducting Portions, said key-top portion having a pair of second sliding surface portions facing, and having a surface curvature corresponding to, to said pair of first sliding surface portions; said pair of force-conducting portions being positioned within said inner space and respectively contacting the corresponding movable contact means, said pair of force-conducting portions being mechanically connected with said key-top portion through said through hole.

5. A multi-directional switch assembly comprising:

a substrate having two pairs of electrical contact portions formed on a surface of said substrate and located symmetrically with respect to a center position, each of said electrical contact portions having a pair of separate electrical contacts;

a first member having two parts of protuberant portions corresponding to said two pairs of electrical contact portions and placed on said substrate, each of said protuberant portions having a conductive layer and a resilient means supporting said conductive layer, said two pairs of protuberant portions being placed so that said conducting layers are closely spaced from the corresponding pair of separate electrical contacts;

a second member mechanically fixed to said substrate, said second member having an outer surface, an inner space and a circular through hole, the imaginary center of said circular through hole being in alignment with said center position on said substrate, said outer surface having a first sliding surface portion located around said circular through hole and has a shape constituting part of a spherical surface; and a third member having a first portion, a second portion, and two pairs of third portions, said first portion having a second sliding surface portion facing, and having a curved surface corresponding to said first sliding surface portion, said two pairs of third portions being positioned within said inner space and placed respectively on the corresponding protuberant portions, said second portion including a cylindrical portion the sectional diameter of which is smaller than the diameter of said circular through hole to allow said third member to tilt, said cylindrical portion of said second portion mechanically connecting said two pairs of said third portions with said first portion through said through hole.

6. The multi-directional switch assembly according to claim 5, wherein said second member further comprises a third sliding surface portion facing said inner space, said third sliding surface portion being located around said circular through hole, having a shape constituting part of a spherical surface and extending substantially in parallel with said first sliding surface portion, wherein said third member further comprises a fourth portion mechanically connected to said second portion and having a fourth sliding surface portion facing, and having a curved surface corresponding to said third sliding surface portion.

7. A multi-directional switch assembly comprising:

a substrate having two pairs of electrical contact portions formed on a surface of said substrate and arranged symmetrically with respect to a center position, each of said electrical contact portions having a pair of separate electrical contacts;

a first member having two parts of protuberant portions corresponding to said two pairs of electrical contact portions and placed on said substrate, each of said two pairs of protuberant portions having a conductive layer and a resilient means supporting said conductive layer, said two pairs of protuberant portions being formed so that said conducting layers are closely spaced from the corresponding pair of separate electrical contacts;

a second member mechanically fixed to said substrate, said second member having an outer surface, an inner space and a circular through hole, the imaginary center line of said circular through hole being in alignment with said center position on said substrate, said outer surface having a first sliding surface portion which surrounds said circular through hole and has a shape constituting part of a spherical surface; and a third member located within said inner space and having two pairs of force-conducting portions being arranged symmetrically with respect to an imaginary center line and placed respectively on the corresponding protuberant portions so that said imaginary center line of said third member is registered to said center position on said substrate and to said imaginary center line of said circular through hole, said third member further having a cylindrical hole the imaginary center line of which is in alignment with said imaginary center line of said third member; and a fourth member located on said second member, said fourth member having a second sliding surface portion facing, and having a surface curvature corresponding to said first sliding surface portion, said fourth member further having a cylindrical projection extending through said through hole and being fitted in said cylindrical hole whereby said fourth member is mechanically connected to said two pairs of force-conducting portions, said cylindrical projection having a sectional diameter of which is smaller than the diameter of said circular through hole to allow said fourth member to tilt.

8. The control key device according to claim 7, wherein said second member further comprises a third sliding surface portion facing said inner space, said third sliding surface portion surrounding said circular through hole, having a shape constituting part of a spherical surface and extending substantially in parallel with said first sliding surface portion, wherein said third member further comprises a fourth sliding surface portion facing, and having a surface curvature corresponding to said third sliding surface portion.

9. A multi-directional switch assembly comprising:

a casing having a generally dome-shaped portion, said dome-shaped portion having a top surface with spherical curvature and a through hole provided at a central part of said dome-shaped portion;

a substrate provided within said casing and having a plurality of electrical contact portions, each of said electrical contact portions having a pair of electrical contacts;

a resilient member provided on said substrate and having a plurality of bulges at positions corresponding to said electrical contact portions, each of said bulges having an electrically conductive portion which makes electrical contact with the corresponding one pair of the electrical contacts when the bulge is resiliently deformed;

a contact pressing member provided on said resilient member and having a plurality of legs at positions corresponding to said bulges; and a key member secured on said contact pressing member via said through hole in a dome-shaped portion of said casing, said key member having a home position and a tilted position, said contact pressing member being approximately level and said legs resting on the corresponding bulges in the home position of said key member when said key member is free of a pressing force, one of said legs resiliently deforming the corresponding bulge to achieve electrical contact between the corresponding one pair of the electrical contacts in the tilted position of said key member when said key member receives a pressing force, said key member having a partial spherical curved surface facing and corresponding to said top surface, the tilting of said key member being guided by the engagement of said partial spherical curved surface with said top surface.

10. A multi-directional switch assembly comprising:

a casing having a generally dome-shaped portion provided at an arbitrary part of the casing, said dome-shaped portion having a spherical curved top surface and a through hole provided at a central part of said dome-shaped portion;

a substrate provided within said casing and having a plurality of electrical contact portions;

a resilient member provided on said substrate and having a plurality of bulges at positions corresponding to said electrical contact portions, each of said bulges having an electrically conductive portion which makes electrical contact with the corresponding one of the electrical contact portions when the bulge is resiliently deformed;

a contact pressing member provided on said resilient member and having a plurality of legs at positions corresponding to said bulges of said resilient member; and a key member secured on said contact pressing member via said through hole in a dome-shaped portion of said casing, said key member having a home position and a tilted position, said contact pressing member being approximately level and the legs resting on the corresponding bulges of said resilient member in the home position of said key member, one of said legs of said contact pressing member resiliently deforming a corresponding one of the bulges of said resilient member to achieve electrical contact between the electrically conductive portion of said corresponding one bulge and a corresponding one of the electrical contact portions of said substrate in the tilted position said key member, said key member having a sliding surface portion which makes sliding contact with the top surface of the dome-shaped portion of said casing when tilting to the tilted position and being automatically returned from the tilted position to the home position by a resilient restoration force exerted by said resilient member, at least the tilting of said key member from the home position to the tilted position being substantially guided by the top surface of the dome-shaped portion as the sliding portion makes sliding contact with said top surface, so that an external force applied on said key member is distributed on said dome-shaped portion and is prevented from being applied directly on said substrate.

\* \* \* \* \*